June 8, 1965   J. E. H. WESTBERG   3,188,101
EXPANSIBLE CLAMP ARBOR
Filed Nov. 5, 1962

INVENTOR
JOHAN ERIC HAYDEN WESTBERG
BY
ATTORNEYS

United States Patent Office 3,188,101
Patented June 8, 1965

3,188,101
EXPANSIBLE CLAMP ARBOR
Johan Eric Hayden Westberg, Rodstugevagen 14,
Lidingo, Sweden
Filed Nov. 5, 1962, Ser. No. 235,229
Claims priority, application Sweden, Nov. 13, 1961,
11,267/61
9 Claims. (Cl. 279—2)

This invention refers to clamp arbors insertable in a machine and designed to grip a workpiece internally and to hold it during machining.

For the purpose mentioned it is known to use clamp arbors with arms that centrally rest on a taper, which when moved axially in one direction drives the arms radially outwards to clamp a workpiece. The designs vary in details, but all have a number of weaknesses in common. Partly the arms are not moving parallel, resulting in poor positioning and gripping of the workpiece, and in point contact only between the taper of the arbor and the machine holding the arbor. Consequently it has not been possible to use the arbors in machines intended for short and only in the taper guided arms. Furthermore, the arms in use are subjected to bending stresses, which in arbors for workpieces with small holes has limited the clamping force.

Some of the weaknesses are eliminated by designs according to United States Patent No. 2,776,839 and one of my earlier designs of arbors according to United States Patent No. 2,593,638. In those designs the holding portion of the arms in the machine and the clamping portion against the workpiece are peripherally mutually displaced so that a compression of the holding portion of the arms causes a widening of the clamping portion and engagement internally in the workpiece. The manufacturing of those arbors is, however, very complicated, as slots between the arms have to be cut in a very special way or have to be ground smoothly.

The main object of the invention is to avoid as well the weaknesses of the types of arbors first mentioned as the manufacturing difficulties of the last mentioned types of arbors. According to the invention an expansible arbor with two or several arms, which have a holding portion for holding the arbor in a fixture, especially part of a machine, and a clamping portion for internal clamping of a workpiece, has each arm supported along a substantially axial line against one or more central supporting bodies, and further said holding portion of each arm rests against a conical seat in the fixture on one side of a plane through the central axis of the arbor and through the supporting line between said arm and said central supporting body or bodies and said clamping portion of each arm is supported internally against a preferably cylindrical hole in the workpiece on the opposite side of the plane mentioned, so that radial motion of the holding portions forces the arms while resting against the supporting body radially to expand the clamping portions.

Figure 1:
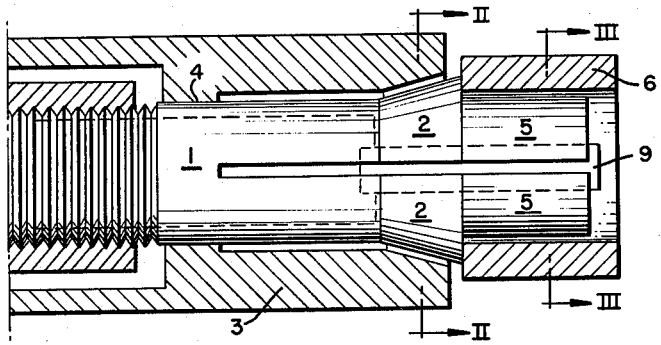
Figure 2:
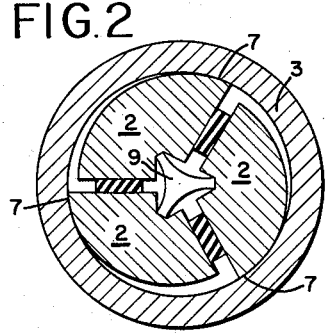
Figure 3:
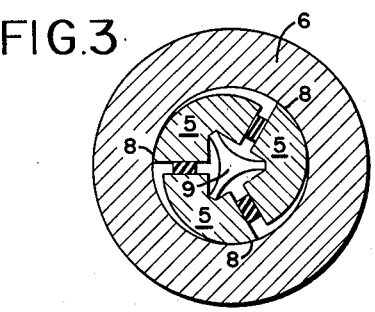
Figure 4:
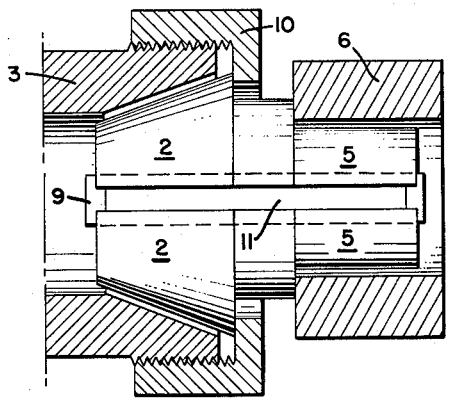
Figure 5:
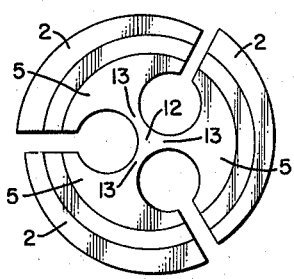
Figure 6:
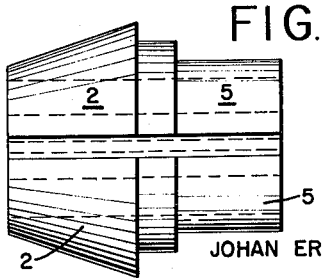

The invention is illustrated by some embodiments shown by way of example on the attached drawing. FIG. 1 is a side view of the clamp arbor according to the invention and adjoining parts in a length section. FIGS. 2 and 3 are, in a larger scale, cross sections along the respective lines II—II and III—III in FIG. 1. FIG. 4 is a side view of a modified embodiment of a clamp arbor according to the invention. FIG. 5 is a longitudinal section of another modified embodiment of a clamp arbor according to the invention. FIG. 6 is an end view of the clamp arbor in FIG. 5.

According to the embodiment shown in FIGS. 1–3 the clamp arbor has three substantially straight arms 1 which have a conical holding portion 2 fitting to a conical seat in a fixture 3 and a cylindrical portion 4 for guidance in the fixture 3 that is fastened to, or is part of a machine. Close to the holding portion 2 the arms have a clamping portion 5 for internal engagement in a preferably cylindrical hole in a workpiece 6, which is to be machined for instance by external turning. Each holding portion 2 is shaped or ground eccentrically on the outside, as shown in FIG. 2, so that each portion 2 has only one line or longitudinal edge 7 resting against the fixture 3. Each clamping portion 5 is also eccentric but in a direction opposite to the eccentricity of each respective holding portion 2, as shown in FIGURE 3, and each portion 5 has only one line or longitudinal edge 8 resting against the workpiece 6. That is the arms 1 are so formed that the part 2 which rests in the taper 3 of the machine has a high edge 7 along one side, and the part 5, which rests in the hole of the workpiece 6 has a high edge 8 along the opposite side.

In the center of the holding and clamping portions there is a central supporting body or support 9 having three edges, each resting in a groove in the portions 2 and 5 of the arms 1. The lines 7 and 8 will consequently be located on opposite sides of a plane through the center line of the clamp arbor and the contact line between the supporting body 9 and the corresponding arm. By symmetry, it follows that the center line of the supporting body 9 will remain in the center of the mandrel when the surrounding arms 1 move symmetrically. During this movement the contact lines between the support and the arms will consequently remain at the same distance from the center. The arms 1 may therefore be considered as balance arms resting on the axial edges of the support 9.

When the clamp arbor moves into the fixture 3, the lines 7 move towards the center, and as the support 9 forms an internal support of the arms, these will twist under a torsional movement of the parts of the arms located between 2 and 4, so that the lines 8 will move in the direction from the center and grip the workpiece. That is, when the mandrel is pulled into the taper 3 this will press the high edges 7 of the holding portions 2 toward the center of the mandrel. However, the arms 1 are supported at a constant radius by support 9; this is possible only if the opposite sides of clamping portions 5 with high edges 8 inside the hole of the work move out from the center. This movement will, however, be limited by the hole mentioned, and pressure from the high edges 8 of the arms will then be exerted on the work 6. As the arms 1, during the clamping action, swing about axial edges of the center support it is evident that the work holding high edges 8 of the arms will move parallel to the center of the mandrel. This is an extremely important feature of a mandrel as it makes high precision and firm holding possible. Thus, the pressure component on the lines 7 is transmitted over the edges of the supporting axis 9 to the lines 8 against the workpiece. The clamping portions 5 are never free bearing but are pressed against the support 9 so that direct bending stresses in these are avoided, and they get considerably stiffer than they would have been if the support had been missing. In addition the supporting axis 9 forces the arms to make a mere rotatory movement resulting in a parallel motion of the clamping portions 5. The manufacturing of the arbor will be simple, as in addition to the external machining it only is required to make simple and straight slots between the arms, and the central grooves for the support.

According to the embodiment shown in FIG. 4 the arbor has somewhat longer holding portions 2 which are free from each other and are held in the fixture 3 by a capscrew 10, and are separated by elastic bodies 11. In other respects the construction and function is the same as shown in FIGS. 1–3.

According to the embodiment shown in FIGS. 5 and 6 the arms that form the tapered holding portion 2 and the cylindrical clamping portion 5 are joined by, or are in one piece with the central supporting body 12. This is extended to the full length of the arms and each section 13 between the supporting body 12 and the arms 2, 5 is peripherically relatively thin so that these sections 13 are flexible in a sideway direction. One can therefore consider each arm 2, 5 to rest against the supporting body 12 after a substantially axial supporting line as for the embodiments according to FIGS. 1–4, and in the same way as for those embodiments a squeeze of the holding portions 2 of the embodiment according to FIGS. 5 and 6 results in an expansion of the clamping portions 5, but the construction with the sections 13 naturally will not permit such a large movement of the arms as when they are journalled on the supporting body according to FIGS. 1–4.

The invention is not limited to the embodiments described and shown on the drawing, as these embodiments can be varied within the scope of the invention. For instance in one modified embodiment the support may be tapered so that the working sizes of the arbor may be varied by moving the support axially. In this case the motion of the arms will not be perfectly parallel, but the conical motion, that results from the conical axis, can partly be compensated for by separating the arms with cuts that make a certain angle against the center-line. Another way to increase the working range for each arbor is to have a number of supporting axes with varying diameters, which axes are exchangeable. In order to prevent the arms from uncontrolled sliding against the supporting axis, this is provided with grooves fitting against edges on the arms or reversed. A number of supporting axes assembled one after the other may form the support between the arms. The arms need not have the cross-section shape shown in FIGS. 2 and 3, but essentially only one against the supporting axis resting part and the two lines 7 and 8 located on each side of a plane going through the axis of the clamp arbor and the contact line of the supporting axis. The arbor may have two and more than three arms.

What is claimed is:

1. An expansible clamp arbor having a plurality of arms, said arms having a holding portion for holding the arbor in a fixture, and a clamping portion for internal clamping of a workpiece, each of said arms being supported along a substantially axial supporting line against at least one central supporting body, and said holding portion of each arm resting in a conical seat in the fixture on one side of a plane through the central axis of the arbor and through the supporting line between said arm and said central supporting body, and said clamping portion of each arm internally contacting the workpiece on the opposite side of the plane mentioned.

2. An expansible clamp arbor according to claim 1, having a number of interchangeable supporting bodies with different width over the supporting surfaces, said bodies being exchangeable for use one at a time in the same clamp arbor.

3. An expansible clamp arbor according to claim 1, the holding portions and the clamping portions having axially elongated surfaces of contact against the fixture and the workpiece.

4. An expansible clamp arbor according to claim 1, having said clamping portions joined with each other by substantially axial and mutually joined torsional arms.

5. An expansible clamp arbor according to claim 1 having the arms joined by elastic material at least partially filling the space between them.

6. An expansible clamp arbor according to claim 1, the portions of the arms directed against the center being provided with substantially axial grooves fitting to substantially axial edges on the supporting body.

7. An expansible clamp arbor according to the claim 1, the portions of the arms directed against the center being provided with axial edges fitting to axial grooves in the supporting body.

8. An expansible clamp arbor according to claim 1, the portions of the arms directed against the center being joined with the central supporting body by in peripherical direction thin and sideways springy portions.

9. An expansible clamp arbor according to claim 1, the supporting body being conical and movable in an axial direction between the arms.

References Cited by the Examiner

UNITED STATES PATENTS

| | | | |
|---|---|---|---|
| 2,593,638 | 4/52 | Westberg | 279—2 |
| 2,776,839 | 1/57 | Benjamin | 279—2 |
| 2,835,498 | 5/58 | Howes | 279—51 |
| 2,868,549 | 1/59 | Westberg | 279—2 |

ROBERT C. RIORDON, *Primary Examiner.*

FRANK SUSKO, *Examiner.*